(12) United States Patent
Shultz

(10) Patent No.: US 6,648,558 B1
(45) Date of Patent: Nov. 18, 2003

(54) CONVEYING PARTICULATE MATERIAL IN A PRESSURIZED GAS

(75) Inventor: Paul Shultz, Watirna South (AU)

(73) Assignee: Birrus International PTY Ltd., Victoria (AU)

( * ) Notice: Subject to any disclaimer, the term of this patent is extended or adjusted under 35 U.S.C. 154(b) by 0 days.

(21) Appl. No.: 09/868,757

(22) PCT Filed: Dec. 23, 1999

(86) PCT No.: PCT/AU99/01138
§ 371 (c)(1),
(2), (4) Date: Aug. 24, 2001

(87) PCT Pub. No.: WO00/39009
PCT Pub. Date: Jul. 6, 2000

(30) Foreign Application Priority Data

Dec. 23, 1998 (AU) .............................................. PP7898

(51) Int. Cl.⁷ .............................................. B65G 51/18
(52) U.S. Cl. ........................ 406/195; 406/154; 137/571
(58) Field of Search ................................. 406/154, 156, 406/194, 195, 197; 222/56; 137/571

(56) References Cited

U.S. PATENT DOCUMENTS

| 3,583,437 | A | * | 6/1971 | Mastroianni et al. ....... 137/558 |
| 4,327,055 | A | * | 4/1982 | Luckenbach et al. ....... 138/149 |
| 4,519,418 | A | * | 5/1985 | Fowler ......................... 137/571 |
| 5,222,529 | A | * | 6/1993 | Zoltan et al. ................ 137/888 |
| 5,240,355 | A | * | 8/1993 | Hudalla ....................... 406/192 |
| 6,350,086 | B1 | * | 2/2002 | Dibble et al. ................ 406/197 |
| 6,443,671 | B1 | * | 9/2002 | Weiste ........................ 406/195 |

FOREIGN PATENT DOCUMENTS

| EP | 0 224 330 | 6/1987 |
| NL | 8303-988 A | 6/1985 |
| WO | 97/27135 | 7/1997 |

* cited by examiner

*Primary Examiner*—Joseph A. Dillon
(74) *Attorney, Agent, or Firm*—Burr & Brown

(57) ABSTRACT

Particulate material entrained in pressurized gas such as compressed air is conveyed from a pressure vessel to a discharge vessel through a conveyor duct. The discharge end of the duct is fitted with a flow restrictor producing a discrete constriction of the flow discharging from the duct into the vessel with the result that the pressure drop along the main part of the duct is reduced so that lower velocities can be maintained within the duct.

13 Claims, 3 Drawing Sheets

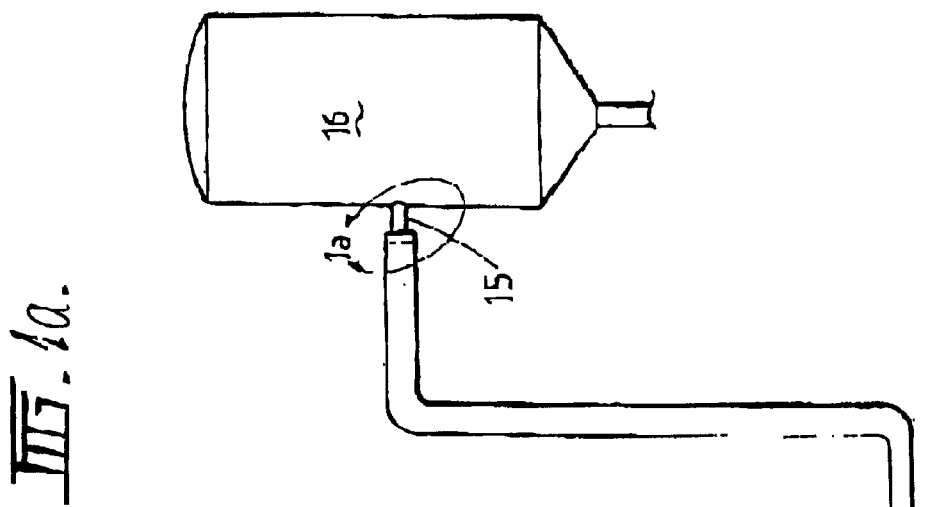
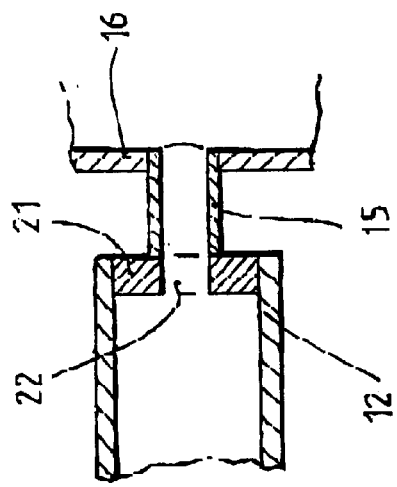
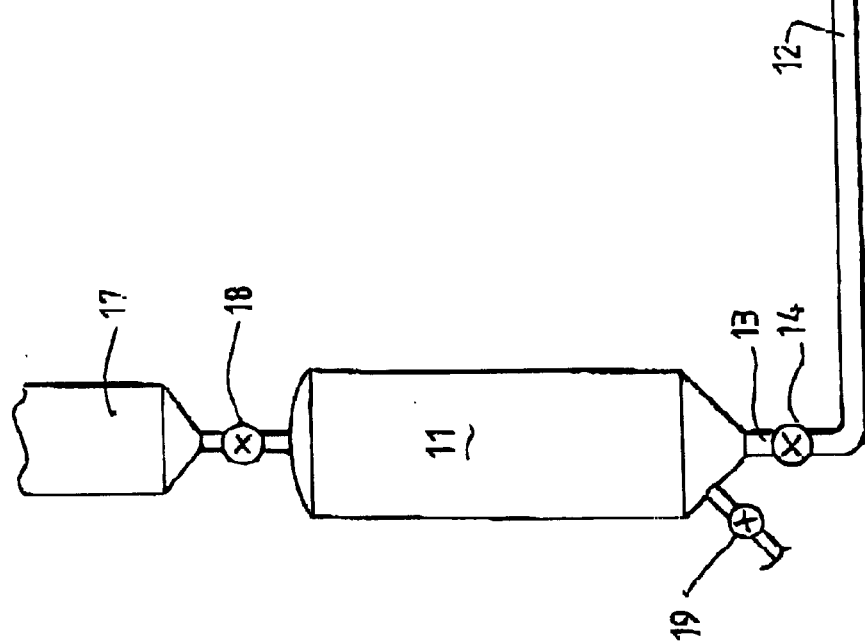

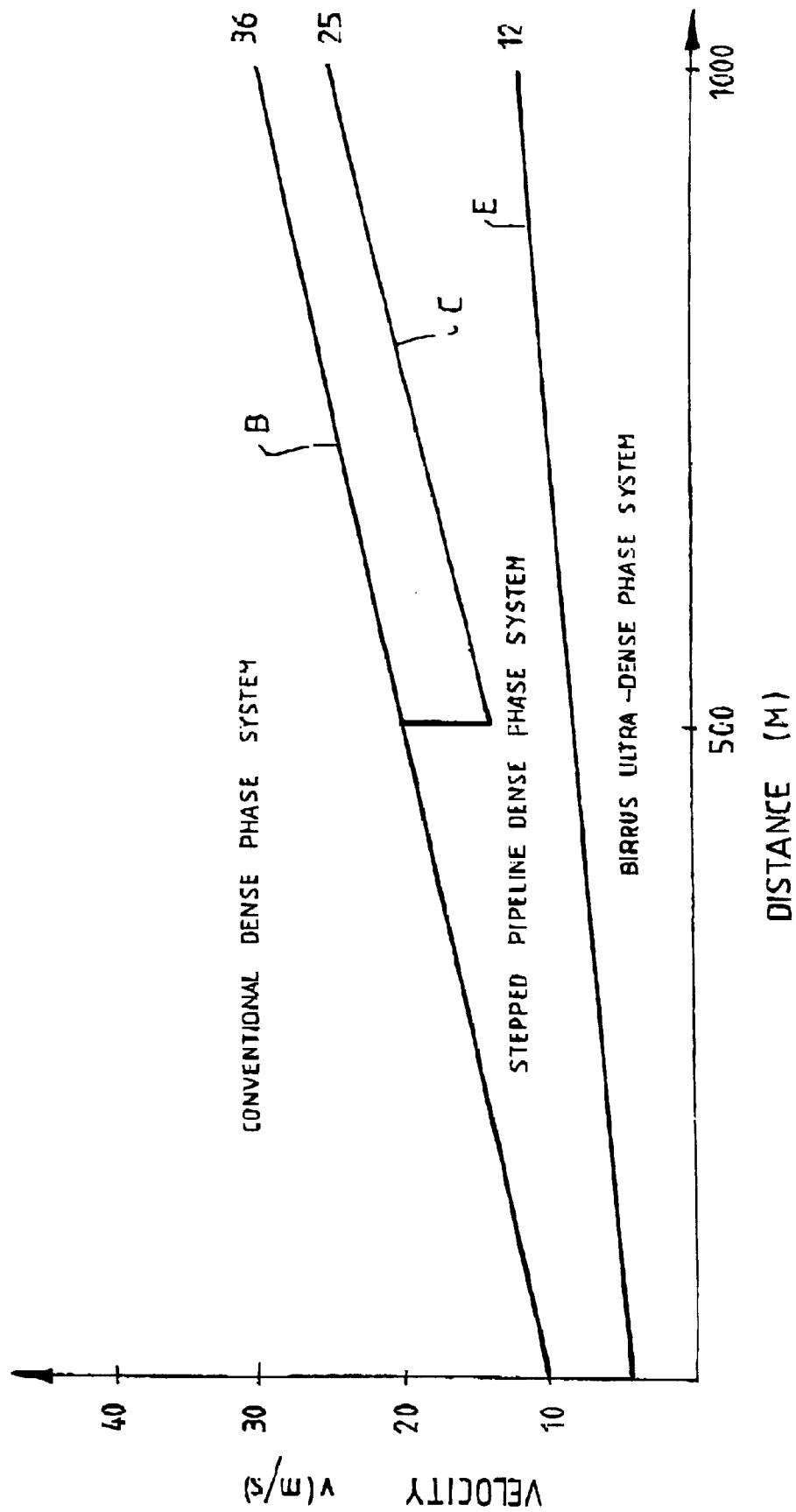

CONVEYING PARTICULATE MATERIAL IN A PRESSURIZED GAS

TECHNICAL FIELD

This invention relates to the conveying of particulate material suspended or entrained in a pressurised gas and conveyed with the gas along a duct.

The invention has particular application to pneumatic conveying of powdery particulate material although there will be applications in which the particulate material to be conveyed is not strictly in the form of a powder and/or in which the conveying gas may be a gas other than air.

One particular application of the invention is in the field of "Dense Phase" conveying in which compressed air at relatively high pressure of the order of two bar or more is applied to a pressure vessel charged with a batch of material to be conveyed and the material is conveyed along a duct extending from the pressure vessel to a discharge outlet from the duct, usually into a discharge vessel. Conveying rates in such systems vary widely, commonly falling in the range 5 to 50 tonne/hr but can be anything from under 1 tonne/hr to over 1000 tonne/hr. Conveying distances can vary between a few hundred meters to several kilometers.

Dense Phase pneumatic conveying is used for conveying a wide range of powdery or fine grained materials such as mineral powders, fine granular aluminium, cement, quick lime, coal dust, flour and other food powders, and pharmaceutical powders. Some of these materials can be difficult to handle in that they cause abrasive damage to the conveying duct and the material itself can suffer severe and detrimental attrition in passing through the duct. It is therefore important to control the peak velocity of the material passing through the conveyor duct. In a conventional system the pressure along the duct steadily reduces at a constant rate throughout the length of the duct to fall to atmospheric pressure at the discharge end of the duct. Accordingly, if the duct is a simple cylindrical pipe of constant diameter, the velocity of the material flowing through the duct will progressively rise as the pressure declines and this can result in extremely high velocities in the pipe. It is therefore normal to provide a duct in the form of stepped piping of successively increasing diameter so as to produce successive step-wise reductions in velocity of the material along the pipe. This adds to the complexity of the system, requiring careful design, fabrication and installation. Particularly in long distance applications it can also result in a need for very large diameter pipes. All of these factors produce sufficiently increased costs. Moreover, the velocities of material in the duct can still be excessive and with many materials, duct abrasion and material attrition remains a problem. By the present invention these problems can be very significantly reduced and the fabrication of the conveyor ducting can be very much simplified.

DISCLOSURE OF THE INVENTION

According to the invention there is provided a method of conveying particulate material comprising:

locating a quantity of particulate material to be conveyed within a pressure vessel;

pressurising the pressure vessel with pressurised gas;

directing pressurised gas and entrained particulate material from the pressure vessel into a conveyor duct through which the material is conveyed to a discharge location; and discharging the conveyed particulate material from the duct at the discharge location;

wherein the flow of gas and entrained particulate material discharging from the duct is subjected to constriction producing a discrete pressure drop of at least 5 kPa.

Preferably, the conveyed material is discharged from the duct into a discharge vessel at said discharge location, the pressure within the discharge end of the duct upstream of the restriction being at least 5 kPa greater than the pressure within the discharge vessel.

The pressurised gas may be pressurised air and the interior of the discharge vessel may be at atmospheric pressure.

Preferably, the pressure drop caused by the restriction of the discharge flow is in the range 100 to 200 kPa.

The pressure vessel may be pressurised to a pressure of at least 3 bar.

The particulate material may be conveyed through said duct through a distance in the range 50 meters to 5 km, although even greater distances are feasible.

The invention also provides conveyor apparatus for conveying particulate material, comprising:

a pressure vessel to receive a charge of particulate material to be conveyed;

pressurising means to pressurise the pressure vessel with pressurised gas;

a conveyor duct having an inlet connected to the pressure vessel to receive pressurised gas and entrained particulate material from the pressure vessel and extending to a discharge end of the duct; and a flow restrictor at the discharge end of the duct to present a discrete reduction of at least 20% in the effective cross-sectional area for flow from the discharge end of the duct.

Preferably, the discharge end of the duct is connected to a discharge vessel to receive the discharging flow of gas and conveyed particulate material.

The pressurising means may comprise means to admit pressurised air into the pressure vessel. That means may comprise an air compressor providing a source of the pressurised air.

The duct may be in the form of a tubular pipe.

The restrictor may be in the form of an orifice plate installed in the discharge end of the duct and provided with an orifice providing the reduced cross-sectional area for discharge flow.

The orifice plate may, for example, be an annular plate defining a circular central orifice.

BRIEF DESCRIPTION OF THE DRAWINGS

In order that the invention may be more fully explained one particular embodiment will be described with reference to the accompanying drawings in which:

FIG. 1 is a schematic diagram of a pneumatic conveyor system constructed and operated in accordance with the present invention;

FIG. 1A is an enlarged cross-section through part of the system shown in FIG. 1;

FIG. 3 is a diagram contrasting flow velocities experienced in the conventional system with velocities experienced in the equivalent system according to the invention.

DETAILED DESCRIPTION OF THE PREFERRED EMBODIMENT

Figure 2:
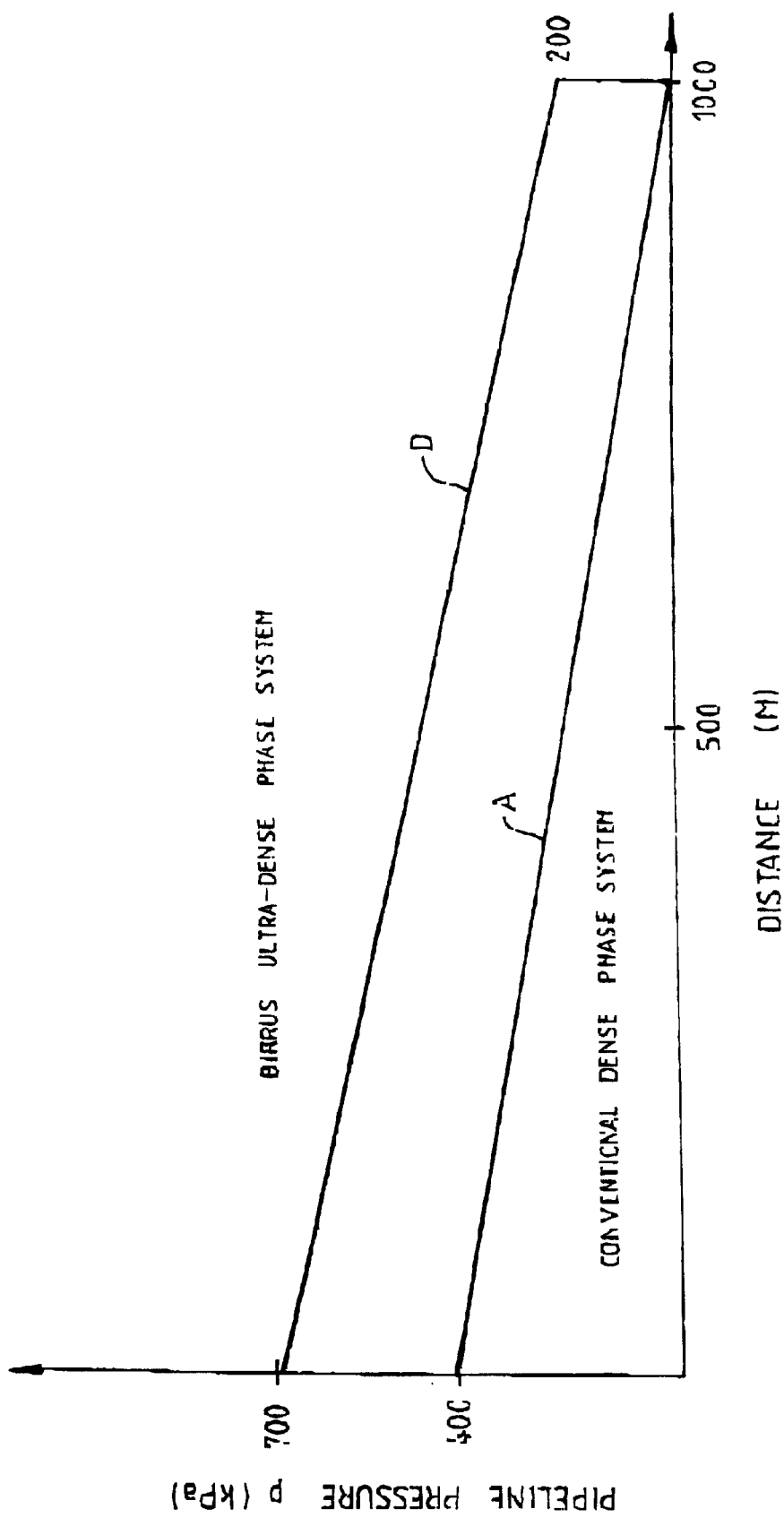
FIG. 2 is a diagram contrasting the pressure and velocity variations along a conveyor duct in a typical conventional "Dense Phase" pneumatic conveyor system with the pressure variation along a duct in an equivalent "Dense Phase" system according to the present invention.

FIG. 1 diagrammatically illustrates a "Dense Phase" pneumatic conveyor system comprising a pressure vessel 11, a long conveyor duct 12 connected to the bottom of the pressure vessel 11 through a duct inlet 13 fitted with a control valve 14 and extending to a duct outlet 15 connected to a discharge vessel 16.

A particulate feed hopper 17 is connected to the upper end of pressure vessel 11 to enable a charge of particulate material to be delivered into the vessel. The vessel can then be sealed by closing an upper valve 18 and the interior of the vessel pressurised by the supply of compressed air through an air inlet 19. Depending on the particular application, the compressed air may be supplied from a standard plant reticulated air supply at pressure of the order of 4 to 8 bar or, it may be supplied from a dedicated air compressor which may supply air at considerably higher pressures, for example the order of 45 bar.

When pressure vessel 11 has been pressurised, valve 14 is opened to allow pressurised air and entrained particulate material to flow through duct 12 to the duct discharge end 15 where it discharges into discharge vessel 16 the interior of which is at atmospheric pressure. In a conventional system the pressure in duct 12 reduces in a linear fashion from the inlet 13 through to the discharge duct end 15 in the manner indicated by line A in FIG. 2 which plots the duct pressure against distance along the duct from the duct inlet to the duct outlet. If a duct of constant cross-section were to be used with such a pressure distribution the velocity within the duct would progressively increase in the manner indicated by line B in FIG. 3. For this reason, it is normal in conventional systems to employ stepped ducts made from pipe lengths of successively increasing diameter so as to produce a step wise velocity reduction and peak velocity control in the manner indicated by line C in FIG. 3.

In accordance with the present invention the discharge end of conveyor duct 12 is fitted with the restrictor 21 in the form of an annular orifice plate defining a central circular orifice 22. This restrictor produces a discrete constriction of the flow discharging from the discharge end of duct 15 into vessel 16 producing a discrete pressure drop of at least 5 kPa. In order to achieve this result the orifice plate should be dimensioned so as to produce a discrete reduction of the order of 20% or more in the effective cross-sectional area for the discharge flow. For most applications the most useful results will be achieved if the pressure drop caused by the restrictor is in the range 100 to 200 kPa. The effect of the pressure drop is that the reduction of pressure along the duct 12 upstream from the restrictor is very much reduced and it is possible to maintain much lower velocities within the duct. For most applications it is possible to avoid the need for a stepped pipe arrangement and to employ piping of substantially constant diameter of the length of the pipe.

Line D in FIG. 2 shows the pressure distribution along the duct upstream and through the restrictor 21 and line E in FIG. 3 shows the flow velocity along the duct. The region upstream of the restrictor is maintained at a much more constant and higher pressure than compared with the conventional system. The higher pressure is maintained through to the restrictor where there is a discrete pressure drop. Because of this pressure distribution the velocity of the material within duct 12 will rise only slightly throughout the length of the duct through to the restrictor 21. Accordingly, abrasion and material attrition problems are very much reduced and it is possible to employ standard steel pressure piping of essentially constant diameter.

In a typical installation the duct may be made from standard pressure piping having a diameter in the range 60 mm to 300 mm. The pressure vessel may typically range from a few cubic meters to 20 cubic meters although smaller or larger vessels would be possible. Systems in accordance with the invention may be low capacity systems conveying volumes of the order of only 300 kgm/hr. However, for other applications such as ship unloading a system could have a much higher capacity the order of several hundred tonnes/hr. A typical system may employ standard plant compressed air supplied at around 6 bar to produce a useable pressure in the pressure vessel in the order of 5 bar, although in some applications a dedicated pressure may be provided to provide much higher pressures of the order higher pressures. For example, 45 bar compressors are readily available.

The duct may range in length from 50 meters to the order of 5 kilometers. Because of the more constant pressure and very low velocity transportation system achieved by the invention it is feasible to design systems for transport over even longer distances.

The systems in accordance with the invention are best suited to conveying powdery material although other fine particulate materials in flakes, granules or fibres could feasibly be transported. The system could be applied to hot materials if the pressure vessel and conveyor duct is fitted with suitable refractory linings. Particularly in applications dealing with hot materials it may be necessary to hold the material in an inert atmosphere in which case the conveying gas may be an inert gas. It is accordingly to be understood that the invention is in no way limited to the specific system which has been described in detail or to pneumatic systems and that many variations will fall within the scope of the appended claims.

What is claimed is:

1. Conveyor apparatus for conveying particulate material, comprising:
    a pressure vessel that receives a charge of particulate material to be conveyed;
    pressurising means that pressurizes the pressure vessel with pressurised gas;
    a conveyor duct having an inlet connected to the pressure vessel to receive pressurised gas and entrained particulate material from the pressure vessel and convey it in a flow to a discharge end of the duct through which to discharge the conveyed particulate material at a discharge location; and
    a flow constrictor at the discharge end of the duct presenting a discrete reduction of at least 20% in the effective cross-sectional area for flow from the discharge end of the duct so as in use of the apparatus to produce a discrete pressure drop in the discharging flow therethrough.

2. Conveyor apparatus as claimed in claim 1, wherein the discharge end of the duct is connected to a discharge vessel to receive the discharging flow of gas and conveyed particulate material.

3. Conveyor apparatus as claimed in claim 1, wherein the duct is in the form of a tubular pipe.

4. Conveyor apparatus as claimed in claim 1, wherein the pressurising means comprises means to admit pressurised air into the pressure vessel.

5. Conveyor apparatus as claimed in claim 4, wherein the pressurising means comprises an air compressor providing a source of the pressurised air.

6. Conveyor apparatus as claimed in claim 2, wherein the flow constrictor is in the form of an orifice plate installed in the discharge end of the duct and provided with an orifice providing the reduced cross-sectional area for discharge flow.

7. Conveyor apparatus as claimed in claim 6, wherein the orifice plate is an annular plate defining a circular central orifice.

8. A method of conveying particulate material comprising:

locating a quantity of particulate material to be conveyed within a pressure vessel;

pressurizing the pressure vessel with pressurized gas;

directing pressurized gas and entrained particulate material from the pressure vessel into a conveyor duct extending to a discharge location;

conveying the particulate material to the discharge location by flow of that material entrained in the pressurized gas through the conveyor duct;

discharging the conveyed particulate material from a discharge end of the duct at the discharge location by passing the flow of pressurized gas and entrained particulate material through a flow constrictor at the discharge end of the duct which constricts the discharging flow sufficient to produce a discrete pressure drop of at least 5 kPa in the discharge flow.

9. A method as claimed in claim 8, wherein the discharge flow is directed into a discharge vessel for receiving the conveyed material at said discharge location and the pressure within the discharge end of the duct upstream of the flow constrictor is at least 5 kPa greater than the pressure within the discharge vessel.

10. A method as claimed in claim 9, wherein the pressurised gas is pressurised air and the interior of the discharge vessel is at atmospheric pressure.

11. A method as claimed in claim 8, wherein the pressure drop caused by the restriction of the discharging flow is in the range 100 to 200 kPa.

12. A method as claimed in claim 11, wherein the pressure vessel is pressurised to a pressure of at least 3 bar.

13. A method as claimed in claim 12, wherein the particulate material is conveyed through said duct through a distance of at least 50 meters.

* * * * *